S. N. HALL.
PUMP MECHANISM.
APPLICATION FILED SEPT. 8, 1920.
1,388,427.
Patented Aug. 23, 1921.
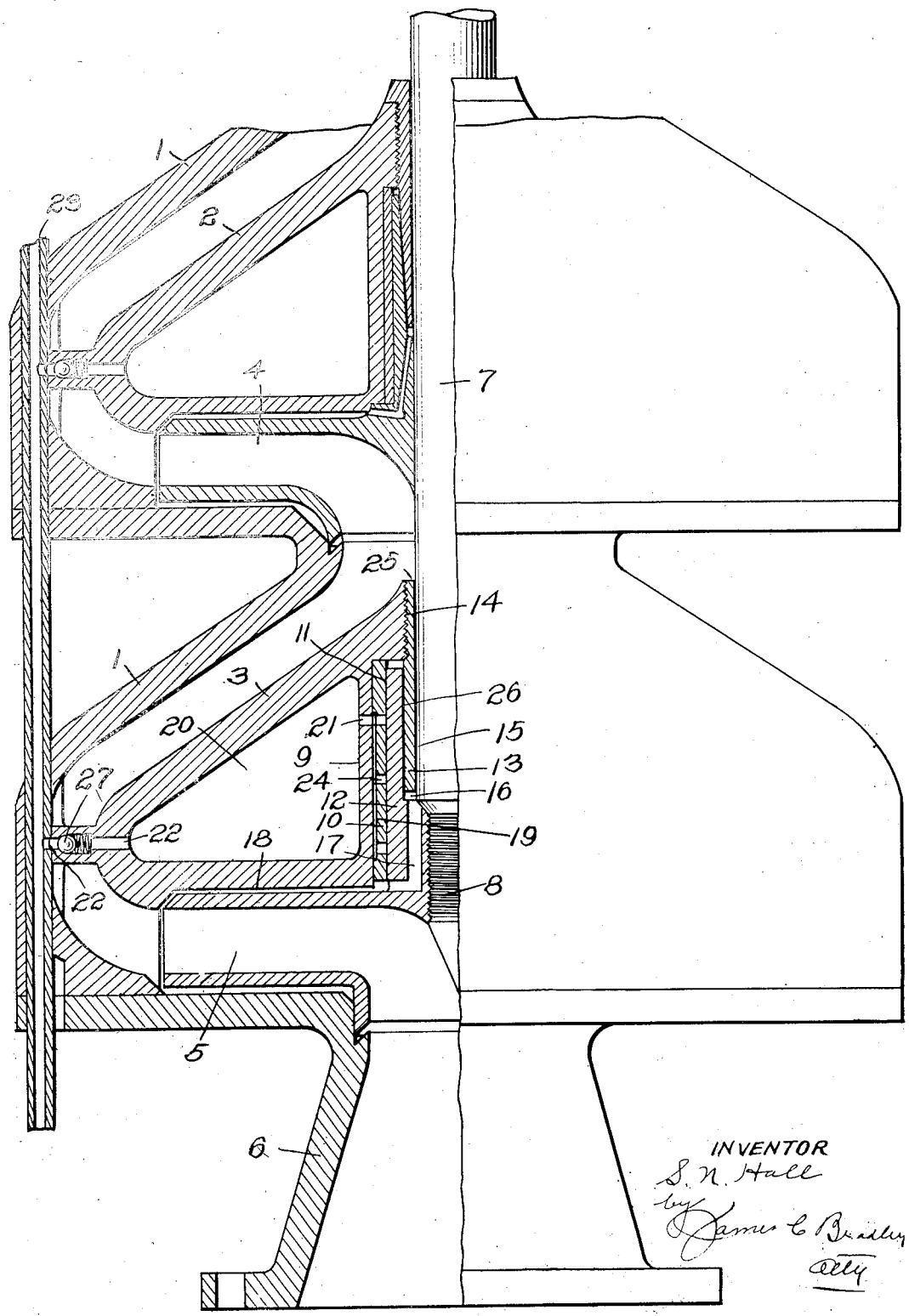
INVENTOR
S. N. Hall
by James C. Bradley
Atty.

UNITED STATES PATENT OFFICE.

SAMUEL N. HALL, OF LOS ANGELES, CALIFORNIA, ASSIGNOR TO MAHLON E. LAYNE, OF LOS ANGELES, CALIFORNIA.

PUMP MECHANISM.

1,388,427. Specification of Letters Patent. Patented Aug. 23, 1921.

Application filed September 8, 1920. Serial No. 408,948.

*To all whom it may concern:*

Be it known that I, SAMUEL N. HALL, a citizen of the United States, residing at Los Angeles, in the county of Los Angeles and State of California, have invented certain new and useful Improvements in Pump Mechanism, of which the following is a specification.

The invention relates to mechanism for use in connection with centrifugal pumps and particularly to a means for lubricating the pump bearings and protecting them. The invention has for its principal objects the provision of improved means for lubricating the bearings of a multi-stage centrifugal pump and for protecting such bearings from access of water and sand. The variations of pressure at the upper and lower ends of bearings in pumps of this type tends to create a circulation longitudinally of the bearings and cause sand and dirt to be carried between the bearing surfaces which in the course of time causes wear requiring replacement and increasing friction losses. The present invention is designed to avoid this difficulty and at the same time provide for the proper and effective lubrication of all the bearing surfaces in the pump. Briefly stated this is accomplished by providing by-pass spaces paralleling the bearings and communicating with the same areas as the bearings at the ends of such bearings, so that when differences of pressure occur at the ends of the bearings the circulation will follow the path of least resistance and flow through the by-pass spaces instead of between the bearing surfaces. At the same time oil is supplied freely between the bearing surfaces still further tending to prevent a circulation of water along such surfaces. One embodiment of the invention is illustrated in the accompanying drawing, wherein—

The figure is a partial vertical section and partial side elevation of a portion of a centrifugal pump equipped with the invention.

Referring to the drawing, 1 is the outer portion of the pump casing; 2 and 3 are what may be termed inner casing members connected to the outer casing member by suitable webs; 4 and 5 are the pump runners or impellers; 6 is the inlet to the lower end of the pump casing; and 7 is the drive shaft for the impellers, such drive shaft being screwed into the lower impeller 5 as indicated at 8 and being keyed to the impeller 4. Only the lower portion of the pump is illustrated, and it will be understood that the number of stages may be multiplied as desired above the runner 4, the bearing and oiling construction as illustrated and hereinafter described, being duplicated for each successive runner. As these bearing and lubricating features are the same for all the runners, only that used in connection with the lower runner 5 will be described.

The inner web 9 of the pump casing member 3 is provided with bushing 10 held in position by reason of the tight fit or in any other desired way. The inner face 11 of this bushing constitutes the bearing for the runner 5, this being provided by making integral with the runner the bearing hub 12 whose outer surface engages the surface 11 of the bushing. Projecting down into this bearing hub 12 is the sleeve 13, such sleeve being screwed into the casing member 3 as indicated at 14. The inner surface 15 of this sleeve is out of contact with the surface of the shaft 7, thus providing a clearance space. Leading down from the annular space 16 at the lower end of the sleeve 13 are one or more relief passages 17 which communicate with the clearance space 18 between the top of the runner 5 and the lower face of the casing member 3.

The outer face of the bushing 10 is provided with a shallow groove 19 extending circumferentially around the bushing and this groove is placed in communication with a chamber 20 in the casing member 3 by means of one or more perforations 21. Oil is supplied to the chamber 20 through the passage 22 leading to the oil pipe 23. The check valve 27 normally prevents any outflow of oil through passage 22. The oil pipe 23 leads to the surface of the ground and oil may be supplied continuously or intermittently to the various oil chambers 20. In order to provide for supplying the oil to the inner face 11 of the bushing the perforations 24 are provided through the bushing 10.

The foregoing arrangement provides for the protection of the bearing surfaces between the bushing 10 and bearing hub 12 from the access of water and sand and further provides for the proper lubrication of such bearing surfaces. There is normally a certain amount of pressure at the point 25 and a certain amount of suction in the space 18 when the pump is in operation and this tends to circulate water along the bearing surface between these levels. It will be seen that the present arrangement provides for directing this circulation along a path other than the bearing surface 11 between the bushing 10 and hub 12 of the runner. Any water and sand which are forced in or drawn in along the line 25 will pass down through the clearance or by-pass space 15 to the space 16 and thence through the passage or passages 17 to the space 18 above the runner 5. The resistance to the movement of the liquid through the passage 17 is less than that along the lines 26 and 11 so that there is no tendency of the liquid to be drawn along the bearing surface indicated by the line 11. The constant supply of oil along this line also tends to prevent access of water to these bearing surfaces. As a result the bearing surfaces between the runner and the bushings in the pump casing are fully protected and lubricated so that there is practically no requirement for replacement or repair at these bearings.

What I claim is:

1. In combination in a centrifugal pump, an inner pump casing member provided with a bearing recess, an impeller or runner opposing the end of such member and provided with a bearing hub extending into said recess, a sleeve member secured to the other end of the casing member and projecting inside the bearing hub, a drive shaft extending through said sleeve and connected to drive the runner, and a relief passage leading from the space between said sleeve and the bearing hub.

2. In combination in a centrifugal pump, an inner pump casing member provided with a bearing recess, an impeller or runner opposing the end of such member and provided with a bearing hub extending into said recess, a sleeve member secured to the other end of the casing member and projecting inside the bearing hub, a drive shaft extending through said sleeve and connected to drive the runner, a relief passage leading from the space between said sleeve and the bearing hub, and means for supplying a lubricant to the outer surface of the bearing hub.

3. In combination in a centrifugal pump, an inner pump casing member provided with a bearing recess, having its wall perforated, means for applying a lubricant through said wall, an impeller or runner opposing the end of such member and provided with a bearing hub extending into said recess, a sleeve member secured to the other end of the casing member and projecting inside the bearing hub, a drive shaft extending through said sleeve and connected to drive the runner, and a relief passage leading from the space between said sleeve and the bearing hub.

4. In combination in a centrifugal pump, an inner pump casing member provided with a bearing recess, an impeller or runner opposing the end of such member and provided with a bearing hub extending into said recess, a sleeve member secured to the other end of the casing member and projecting inside the bearing hub, a drive shaft extending through said sleeve, but out of bearing contact therewith and connected to the runner, and a relief passage leading from the space between said sleeve and the bearing hub.

5. In combination in a centrifugal pump, an inner pump casing member provided with a bearing recess, an impeller or runner opposing the end of such member and provided with a bearing hub extending into said recess, a sleeve member secured to the other end of the casing member and projecting inside the bearing hub, a drive shaft extending through said sleeve, but out of bearing contact therewith, and connected to the runner, a relief passage leading from the space between said sleeve and the shaft, and means for supplying a lubricant through the casing member to the bearing surface between said hub and the bearing surface carried by the casing member.

6. In combination in a centrifugal pump, an inner pump casing member provided with a bearing recess, an impeller or runner opposing the end of such member and provided with a bearing hub extending into said recess, a sleeve member secured to the other end of the casing member and projecting inside the bearing hub, a drive shaft extending through said sleeve and connected to drive the runner, and a relief passage leading from the space between said sleeve and the bearing hub and from the space between the sleeve and shaft.

7. In combination in a centrifugal pump, an inner pump casing member provided with a bearing recess, an impeller or runner opposing the end of such member and provided with a bearing hub extending into said recess, a sleeve member secured to the other end of the casing member and projecting inside of the bearing hub, a drive shaft extending through said sleeve and connected to drive the runner, a relief passage leading from the space between said sleeve and the bearing hub, and from the space between the sleeve and the shaft and means for supplying a lubricant to the bearing surface of the hub.

8. In combination in a centrifugal pump, an inner pump casing member provided with a bearing recess, an impeller or runner opposing the end of such member and provided with a bearing hub extending into said recess, a sleeve member secured to the other end of the casing member and projecting inside the bearing hub, a drive shaft extending through said sleeve, but out of bearing contact therewith and connected to the runner, and a relief passage leading from the space between said sleeve and the bearing hub, and from the space between the sleeve and the shaft.

9. In combination in a centrifugal pump, an inner pump casing member provided with a bearing recess, an impeller or runner opposing the end of such member and provided with a bearing hub extending into said recess, a sleeve member secured to the other end of the casing member and projecting inside the bearing hub, a drive shaft extending through said sleeve, but out of bearing contact therewith and connected to the runner, and a relief passage leading from the space between said sleeve and the bearing hub, and from the space between the sleeve and the shaft, and means for supplying a lubricant to the bearing surface of the hub.

S. N. HALL.